US005541012A

United States Patent [19]
Ohwaki et al.

[11] Patent Number: 5,541,012
[45] Date of Patent: Jul. 30, 1996

[54] INFRARED-TO-VISIBLE UP-CONVERSION MATERIAL

[75] Inventors: Junichi Ohwaki, Mito; Yuhu Wang, Chiyoda-Ku; Atsushi Shibukawa, Higashi-Igaraki-gun; Naruhito Sawanobori; Shinobu Nagahama, both of Chiyoda-ku, all of Japan

[73] Assignees: Nippon Telegraph and Telephone Corporation; Sumita Optical Glass, Inc., both of Tokyo, Japan

[21] Appl. No.: 329,683

[22] Filed: Oct. 26, 1994

Related U.S. Application Data

[63] Continuation of Ser. No. 58,144, May 10, 1993, abandoned.

[30] Foreign Application Priority Data

| May 8, 1992 | [JP] | Japan | 4-115638 |
| Jul. 9, 1992 | [JP] | Japan | 4-182186 |
| Jul. 9, 1992 | [JP] | Japan | 4-182188 |
| Mar. 11, 1993 | [JP] | Japan | 5-050248 |

[51] Int. Cl.⁶ ..................................... B32B 9/00
[52] U.S. Cl. .............. 428/690; 372/43; 313/503; 252/301.4 R
[58] Field of Search .................. 428/690, 691, 428/688, 689, 428; 372/41, 68, 70, 43; 430/139; 252/301.4 R; 313/502, 503

[56] References Cited

U.S. PATENT DOCUMENTS

| 3,163,610 | 12/1964 | Yocum | 250/484 |
| 3,506,584 | 4/1970 | Held | 252/301.4 |
| 3,599,109 | 8/1971 | Guggenheim | 372/41 |
| 3,623,907 | 11/1971 | Watts | 117/224 |
| 3,675,155 | 7/1972 | Landry | 372/68 |
| 3,747,017 | 7/1973 | Varsanyi | 372/70 |
| 3,960,754 | 6/1976 | Woodcock | 428/428 |
| 4,239,968 | 12/1980 | Kotera | 250/484 |
| 4,835,398 | 5/1989 | Nakamura | 252/301.4 H |
| 5,028,509 | 7/1991 | Shimada | 430/139 |
| 5,332,907 | 7/1994 | Morlotti | 252/301.4 H |

FOREIGN PATENT DOCUMENTS

| 0029963 | 6/1981 | European Pat. Off. |
| 0345903 | 12/1989 | European Pat. Off. |
| 0523828 | 1/1993 | European Pat. Off. |
| 2430969 | 2/1980 | France |
| 2018352 | 10/1970 | Germany |

OTHER PUBLICATIONS

Encyclopedia of Chemical Technology, 3rd, Kirk–Othmer vol. 14, p. 543 (1980).

*Primary Examiner*—Patrick Ryan
*Assistant Examiner*—Patrick R. Jewik
*Attorney, Agent, or Firm*—Wenderoth, Lind & Ponack

[57] ABSTRACT

A new infrared-to-visible up-conversion material is provided which can be applied to an infrared light identification element having a useful conversion efficiency and sensitivity for infrared light in the wavelength of 1.5 μm band, 0.98 μm band and 0.8 μm band without the necessity of previous excitation of the material. This infrared-to-visible up-conversion material consists of an inorganic material comprising at least two elements of erbium (Er) and a halogen or compounds thereof.

13 Claims, 15 Drawing Sheets

INFRARED-TO-VISIBLE UP-CONVERSION MATERIAL

This application is a continuation of now abandoned application, Ser. No. 08/058,144, filed May 10, 1993.

BACKGROUND OF THE INVENTION

1. Field of the Invention

This invention relates to an infrared-to-visible up-conversion material capable of emitting a reradiated light (fluorescence) containing spectral components in the visible range upon irradiation by infrared light. In particular, it is concerned with an infrared-to-visible up-conversion material which can be applied to an infrared light identification element having a useful conversion efficiency and sensitivity to infrared light in the wavelengths of 1.5 µm band, 0.98 µm band and 0.8 µm band without a necessity of pre-excitation of the material.

2. Description of the Related Art

Recently demands for elements for detecting infrared light are increasing. Applications include detection of a beam position of emitting elements such as laser, LD, LED, etc., pattern identification of mode shapes, etc., searching for a broken point in an optical fiber cable, etc. Systems available for these applications can roughly be classified into a pure electric system, e.g. optical power meter using a semiconductor photodiode, and a visually detectable system using vidicon, image intensifier, IR excitable phospor, etc.

The pure electric system has high sensitivity, but has a disadvantage that visual detection is impossible. On the other hand, the vidicon or image intensifier has a disadvantage that the sensitivity is insufficient and the production cost is higher. Accordingly, a system has been considered promising using an infrared-to-visible up-conversion material such as infrared-excitable phosphors, having visual detectability, relatively high conversion efficiency and sensitivity and lower expense.

A phosphor is generally excited by a suitable excitation source. In the emitted light from the excited phosphor, various spectroscopic distributions can be provided depending upon the variety of the phosphor. Therefore, the phosphor can be applied to various application fields by combination with a suitable excitation source. Above all, a material called "infrared-excitable phosphor" is known as a wavelength up-conversion phosphor of from infrared to visible light. For the anti-Stokes-wise wavelength conversion of from such infrared light to visible light having a markedly large photon energy, it is required to well choose the relationship between the property and excitation wavelength of a material.

As the infrared-to-visible wavelength up-conversion material of the prior art, an IR Sensor Card (commercial name, made by QUANTEX Co.) has well been known. This IR Sensor Card emits red light or blue-green light under infrared irradiation depending on the material of the phosphor. For this sensor, a previous excitation is required before irradiation of infrared light (although possible by room light) and infrared light-excitation is first possible through this previous excitation process. When infrared light is continuously irradiated on this infrared light detecting element, however, there arises a problem that the conversion efficiency is varied with passage of time, although reversible, and the emission intensity of visible light is gradually lowered.

On the other hand, infrared-to-visible wavelength up-conversion materials not needing previous excitation have been reported, typical of which are $YF_3$: Er, Yb; $Y_3OCl_7$: Er, Tb (H. Kuroda et al. J. Phys. Soc. Jpn.; Vol. 33, No. 1, 1972, pp 125–141), $NaLnF_4$; Er, Yb (Ln: Y; Gd, La) (T. Kano et al. J. Electrochem. Soc., Vol. 119, No. 11, 1972, pp 1561–1564); Ba $Y_2F_8$: Er, Yb (Y. Mita et al. Appl. Phys. Lett., Vol. 23, No. 4, 1973, pp. 173–175), ($PbF_2$—$GeO_2$): Er, Yb, ($PbF_2$—$GeO_2$): Tm, Yb (F. Auzel et al., J. Electrochem. Soc., Vol. 122, No. 1, 1975, pp. 101–107). These materials utilize the multiphoton excitation of rare earth ions (mainly $Er^{3+}$ ion).

However, the above described materials utilizing the multiphoton excitation of rare earth ions each have a low conversion efficiency of infrared light and low sensitivity. As described above, the prior art has the disadvantages that a previous excitation is required before irradiation of infrared light and when infrared light is continuously irradiated, the emitting intensity of visible light is gradually lowered. Even if a previous excitation is not required, the conversion efficiency and sensitivity are low.

SUMMARY OF THE INVENTION

It is an object of the present invention to provide an infrared-to-visible wavelength up-conversion material whereby the problems of the prior art can be solved and which is capable of emitting a reradiated light containing spectral components in the visible range upon by irradiation infrared light.

It is another object of the present invention to provide an infrared-to-visible up-conversion material which can be applied to an infrared light detecting element having a useful conversion efficiency and sensitivity for infrared light in the wavelengths 1.5 µm band, 0.98 µm band and 0.8 µm band without the necessity of previous excitation.

These objects can be attained by an infrared-to-visible wavelength up-conversion material consisting of an inorganic material comprising at least two elements of erbium (Er) and halogens or compounds thereof.

BRIEF DESCRIPTION OF THE DRAWINGS

The accompanying drawings are to illustrate the principle and merits of the present invention in detail.

DETAILED DESCRIPTION OF THE INVENTION

Figure 1:
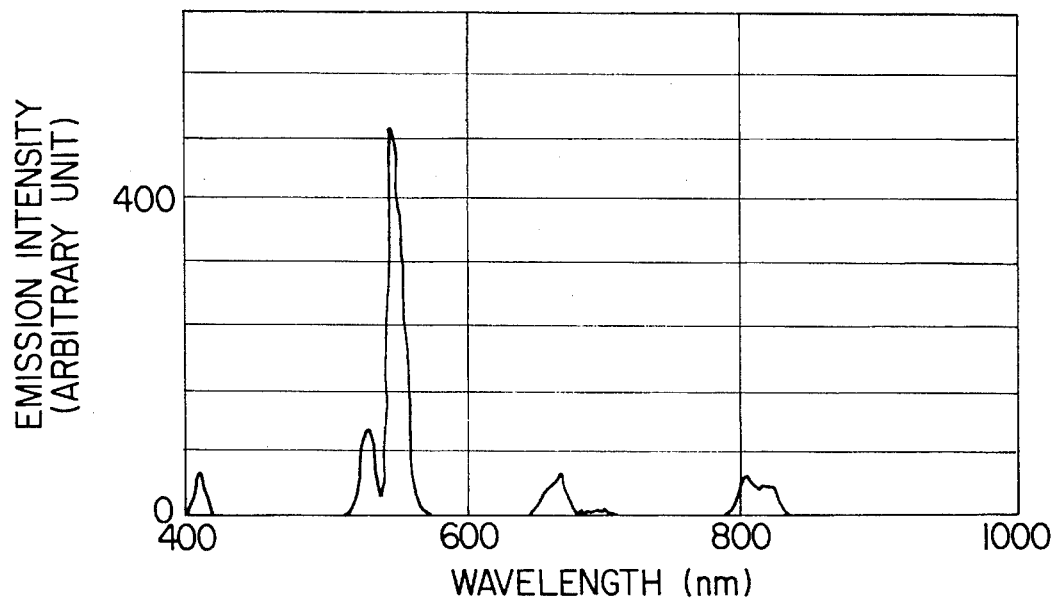
FIG. 1 is an example of an emission spectrum when Example 1 of the infrared-to-visible up-conversion material of the present invention is excited by an infrared light of wavelength 1.5 µm.

The inventors have made various efforts to develop an infrared-to-visible wavelength up-conversion material to be applied to an infrared light detecting element having a useful conversion efficiency and sensitivity for infrared lights and, consequently, have found an infrared-to-visible wavelength up-conversion material consisting of an inorganic material comprising at least two elements of erbium (Er) and halogens or compounds thereof.

When the halogen is chlorine in the above described material, this material contains any element of yttrium (Y), lead (Pb), potassium (K), barium (Ba), sodium (Na) and silver (Ag) or any compound of these elements exclusive of the oxides thereof.

When the halogen is bromine in the above described material, this material contains any element of yttrium (Y), potassium (K) and lead (Pb) or any compound of these elements exclusive of the oxides thereof.

When the halogen is iodine in the above described material, this material contains any element of yttrium (Y), cesium (Cs) and potassium (K) or any compound of these elements exclusive of the oxides thereof.

The emission property of rare earth ions in a solid are strongly dependent on the concentration of the rare earth ions themselves and on a matrix surrounding the rare earth ions. As a matrix material utilizing the multiphoton excitation of rare earth ions, there have been used fluorides, oxyfluorides and oxychlorides. According to the present invention, an infrared-to-visible up-conversion material having a higher conversion efficiency than the materials of the prior art is obtained by finding a new matrix containing no oxygen, as described above, and having a capacity of uniformly accomodating rare earth ions ($Er^{3+}$) in a large amount. That is, the infrared-to-visible up-conversion material of the present invention contains at least Er or halides thereof, such as chloride, bromide and iodide, as additives playing a predominant role of emission, and at least Y and halogens or compounds thereof free from oxygen, Pb and halogens or compounds thereof free from oxygen, K and halogens or compounds thereof free from oxygen, Ba and halogens or compounds thereof free from oxygen, Na and halogens or compounds thereoffree from oxygen, Ag and halogens or compounds thereof free from oxygen, or two or more of Y, Pb, K, Ba, Na and Ag and halogens or compounds thereof free from oxygen, as a matrix material. Herein, the compounds free from oxygen include halides such as bromides and iodides. Specifically, the matrix material includes at least one of Y, K and Pb, bromides or non-oxides thereof, or at least one of Y, Cs and K, iodides or non-oxides thereof.

In summary, the infrared-to-visible up-conversion material of the present invention consists of Er and halogens, and optionally at least one element of Y, Pb, K, Ba, Na and Ag, or compounds thereof free from oxygen and thus can be prepared by mixing these materials in a predetermined proportion and then calcining the mixture.

Specifically, the infrared-to-visible wavelength up-conversion material of the present invention consists of an inorganic material comprising:

| | |
|---|---|
| $ErCl_3$ | 0.5 to 40 mol % |
| Rare Earth Chloride exclusive of $ErCl_3$ (e.g. $YCl_3$) | 0 to 80 mol % (preferably 5 to 80 mol %) |
| Alkaline Earth Chloride (e.g. $BaCl_2$) | 0 to 80 mol % (preferably 5 to 80 mol %) |
| Alkali Metal Chloride (e.g. NaCl) | 0 to 80 mol % (preferably 5 to 80 mol %) |
| $PbCl_2$ | 0 to 60 mol % (preferably 2 to 60 mol %) |
| $CdCl_2$ | 0 to 70 mol % (preferably 2 to 70 mol %) |
| AgCl | 0 to 40 mol % (preferably 2 to 40 mol %) |
| CuCl | 0 to 50 mol % (preferably 2 to 50 mol %) |

When the above described inorganic material contains only $ErCl_3$, the amount thereof is preferably 10 to 35 mol %, and when simultaneously containing $ErCl_3$ and $YbCl_3$, 10 to 40 mol % of $YbCl_3$ and 0.5 to 10 mol % of $ErCl_3$ are preferable.

| | |
|---|---|
| $ErBr_3$ | 0.5 to 50 mol % |
| Rare Earth Bromide excluisve of $ErBr_3$ (e.g. $YBr_3$) | 0 to 70 mol % (preferably 5 to 70 mol %) |
| Alkaline Earth Bromide (e.g. $BaBr_2$) | 0 to 80 mol % (preferably 5 to 80 mol %) |
| Alkali Metal Bromide (e.g. NaBr) | 0 to 70 mol % (preferably 5 to 70 mol %) |
| $PbBr_2$ | 0 to 60 mol % (preferably 5 to 60 mol %) |
| $CdBr_2$ | 0 to 50 mol % (preferably 5 to 50 mol %) |
| AgBr | 0 to 50 mol % (preferably 5 to 50 mol %) |
| CuBr | 0 to 60 mol % (preferably 5 to 60 mol %) |

When the above described inorganic material contains only $ErBr_3$, the amount thereof is preferably 10 to 45 mol %, and when simultaneously containing $ErBr_3$ and $YbBr_3$, 15 to 50 mol % of $YbBr_3$ and 1 to 10 mol % of $ErBr_3$ are preferable.

| | |
|---|---|
| $ErI_3$ | 0.5 to 60 mol % |
| Rare Earth Iodide exclusive of $ErI_3$ (e.g. $YI_3$) | 0 to 70 mol % (preferably 5 to 80 mol %) |
| Alkaline Earth Iodide (e.g. $BaI_2$) | 0 to 80 mol % (preferably 5 to 80 mol %) |
| Alkali Metal Bromide (e.g. CsI) | 0 to 70 mol % (preferably 5 to 70 mol %) |
| $PbI_2$ | 0 to 60 mol % (preferably 5 to 60 mol %) |
| AgI | 0 to 60 mol % (preferably 5 to 60 mol %) |
| CuI | 0 to 60 mol % (preferably 5 to 60 mol %) |
| CdI | 0 to 50 mol % (preferably 5 to 50 mol %) |

Figure 2:
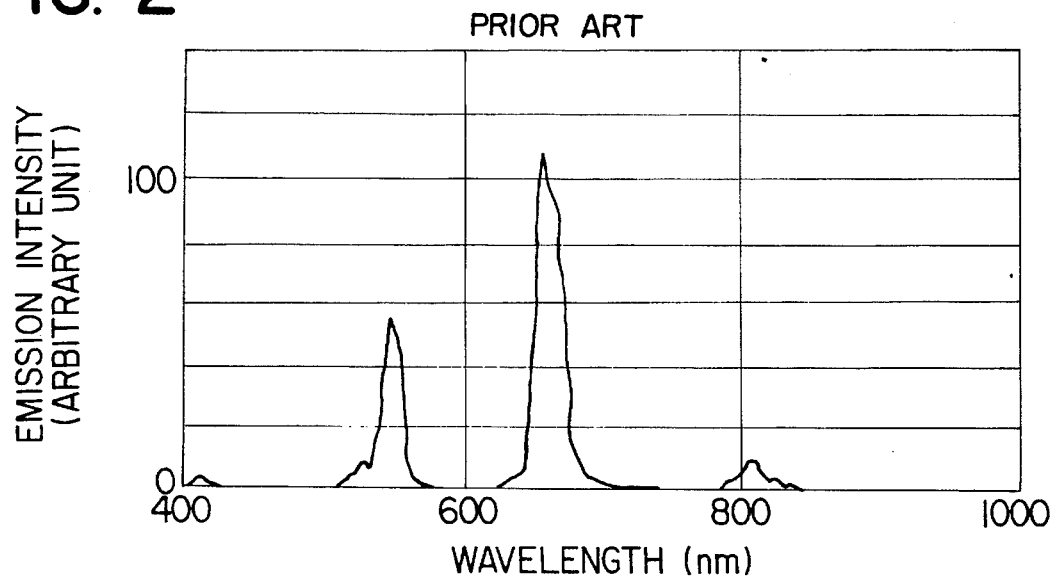
FIG. 2 is an example of an emission spectrum when a commercially available infrared-to-visible up-conversion material of the prior art is irradiated by an infrared light of wavelength 1.5 µm.

In FIG. 1 is shown an example of an emission spectrum when the infrared-to-visible up-conversion material of the present invention is excited by an infrared light of wavelength 1.5 µm. The emission peak wavelengths in FIG. 1 are 405–415 nm, 520–550 nm, 650–670 nm and 790–830 nm. Above all, the emission intensity of 520–550 nm is the strongest and this is perceived as green light by the naked eye. FIG. 2 is an example of an emission spectrum obtained when an infrared-to-visible up-conversion material ($Er(3^+)$-containing fluoride) used in a commercially available article (IR Catcher-Mark 2 —commercial name—made by Tokin Corp.) is irradiated by an infrared light of wavelength 1.5 µm band. In comparison of the emission spectra of FIG. 1 and FIG. 2, the emission spectrum in FIG. 1 tells that the emission intensities of 520–550 nm and 405–415 nm are increased and the emission intensity of 650–670 nm is decreased. Of these emission peaks, the intensity (spectral luminous efficacy) that humans visually feel bright is, for 100 at a wavelength of 555 nm, about 97.5 at 520–550 nm and about 6.5 at 650–670 nm. This tells that a human's eye has, at 520–550 nm, a sensitivity of 15 times higher than at 650–670 nm and briefly teaches that when the emission peak intensity of 520–550 nm is enhanced by two times, a similar brightness can be felt even if the emission intensity at 650–670 nm is lowered to $\frac{1}{30}$. Therefore, the increase of the emission peak intensity at 520–550 nm more than makes up for the decrease of the emission peak intensity at 650–670 nm. It will clearly be understood from the above described results that the infrared-to-visible up-conversion material of the present invention is capable of markedly increasing the conversion efficiency in the 1.5 µm band to visible range wavelength up-conversion, as compared with the materials of the prior art.

The present invention will now be illustrated in detail by the accompanying drawings and following examples:

The present invention and benefits obtained thereby are not intended to be limited by the materials, compositions and preparation methods described in the following examples. Similar benefits can also be obtained in cases, for example, where Er is added, as other compounds or single element, to the material used in the present invention, where the concentration of the addition of Er is varied, where other impurity elements such as Yb as a sensitizer are simultaneously added, where the matrix composition is varied, for example, Y is replaced by other rare earth elements such as La, Gd, Lu, etc., Ba is replaced by other alkaline earth elements such as Ca, Sr, etc., Pb is replaced by other heavy metals such as Tl, Bi, etc. and K or Na is replaced by other alkali elements or alkaline earth elements such as Ba and where the matrix further contains other compounds. Furthermore, even when instead of the LD light source, another emission element having a similar emission spectrum component is used, similar effects can of course be obtained. The infrared-to-visible up-conversion material of the present invention has, in addition to 1.5 µm band, a high sensitivity for infrared light of 0.98 µm band and 0.8 µm band.

It will be obvious to those skilled in the art that various changes and modifications can be made in the components, ratios, operational orders and the like without departing from the spirit of the present invention. Therefore, the present invention should not be construed as being limited to the following examples.

EXAMPLE 1

One embodiment of the infrared-to-visible up-conversion material giving an emission spectrum as shown in FIG. 1 was prepared by the following procedure. Commercially available powdered reagents, $ErCl_3$, $YCl_3$, $BaCl_2$ and $PbCl_2$ (all powders being of at least 3N) were weighed in a predetermined proportion (e.g. $ErCl_3:YCl_3:BaCl_2:PbCl_2=$ 20:15:35:30 mol %), pulverized in a mortar and simultaneously grounded and mixed. The resulting mixed powders was charged in a crucible of glassy carbon and charged in an electric furnace maintained at 650° C., the temperature of the electric furnace being raised. The mixture was maintained at a calcination temperature of 950° C. for 1 hour and adequately reacted, the temperature being gradually lowered at a rate of 5° C./min. When the furnace temperature was lowered to about 650° C., the reacted mixture was taken as a sample. During the calcination, mixed gases of $CCl_4+N_2$ (or $Cl_2$) was flowed in the furnace and contamination of oxygen or moisture was prevented to maintain an atmosphere for chlorination of oxides contained in the raw material. In order to prevent the raw material from oxidation due to contacting with oxygen or moisture, all the procedures of weighing of the reagents, preparation, melting and sintering were carried out in an $N_2$ or Ar gas atmosphere. As the crucible, there could be used those of quartz, platinum or gold in addition to that of glassy carbon.

When raw materials of pure chlorides were not used, for example, oxide raw materials of $Er_2O_3$, $Y_2O_3$, $BaCO_3$, etc. was mixed, charged in a crucible of glassy carbon or platinum, heated in an atmospheric furnace at a high temperature while flowing a strongly reactive gas such as HCl or $Cl_2$ therethrough and effecting chlorination reaction thereof, thus obtaining a similar infrared-to-visible up-conversion material.

Figure 3:
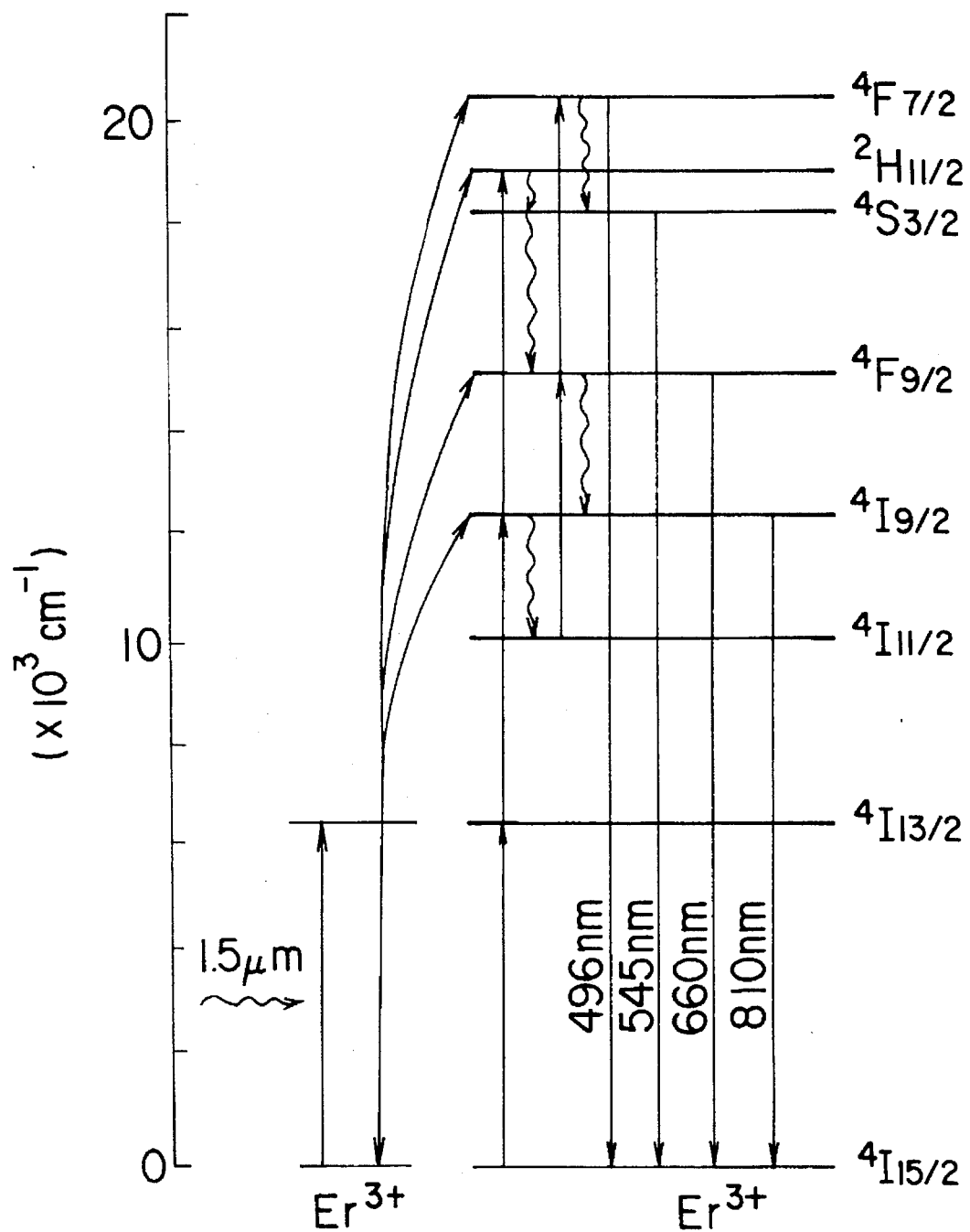
FIG. 3 is a 4f electron energy level of Er (3+) ion showing a 545 nm emission process when an infrared-to-visible wavelength up-conversion material giving the above described emission spectrum of Example 1 is excited by an infrared light of wavelength 1.5 µm band.

The thus prepared infrared-to-visible up-conversion material was excited by and LD light of 1.5 μm (power of 5 mW) to obtain an emission spectrum shown in FIG. 1. On the other hand, an infrared-to-visible up-conversion material (Er(3+) containing fluoride) used in a commercially available article (IR Catcher-Mark 2 —commercial name—made by Tokin Corp.) was similarly irradiated by an infrared light of wavelength 1.5 μm band to obtain an emission spectrum shown in FIG. 2. FIG. 3 shows a 4f electron energy level of Er (3+) ion. In the emission spectra shown in FIG. 1 and FIG. 2, each of the peaks at 410 nm, 522 nm, 545 nm, 660 nm and 800 nm is an emission by the radiative transition of an excited level of 4f electron of Er (3+) ion to the ground level, i.e. $^2H_{9/2} \to {}^4I_{15/2}$, $^2H_{11/2} \to {}^4I_{15/2}$, $^4S_{3/2} \to {}^4I_{15/2}$, $^4F_{9/2} \to {}^4I_{15/2}$ and $^4F_{9/2} \to {}^4I_{15/2}$. The peak intensity of 520–550 nm in the emission spectrum in FIG. 1 is enhanced by about 9 times as large as the same peak intensity of FIG. 2.

An example of the mechanism which is considered as, for example, 15 μm to 545 μm up-conversion process will be shown in the following. As shown in FIG. 3, there are caused a transition of from the ground level ($^4I_{15/2}$) of 4f electron of Er (3+) ion to the excited level ($^4I_{13/2}$) and the transition of from the above described excited level to the above described ground level ($^4I_{13/2} \Delta {}^4I_{15/2}$) by irradiation of an infrared light of 1.5 μm. During the same time, the transition energy is transferred to another Er (3+) ion by non-radiation to cause two stage excitation of from the excited level ($^4I_{13/2}$) to the further upper excited level ($^4I_{9/2}$). By the similar energy transfer, three-stagewise excitation is caused from the excited level ($^4I_{9/2}$) of Er (3+) ion to the further upper excited level ($^2H_{11/2}$). Thus, an emission of 545 nm is obtained by relaxation of from the above described excited level ($^2H_{11/2}$) to the just below level ($^4S_{3/2}$) through non-radiation and transition of this level to the ground level ($^4S_{3/2} \to {}^4I_{15/2}$).

Since the chloride material of the present invention has a smaller phonon energy of the matrix than the oxide or fluoride materials of the prior art, the non-radiative transition of from the excited level to the just below level hardly takes place and the life time is lengthened at the excited level, whereby the green emission at 545 nm is rendered stronger as compared with the prior art materials. From this point of view, not only oxide materials but also fluoride materials cannot be said preferable.

In this example, the material was prepared by a solid or liquid phase reaction, but when it was prepared by a gaseous phase reaction such as vacuum vapor deposition, sputtering vapor deposition or chemical vapor deposition (CVD), the similar effects were obtained.

EXAMPLE 2

Figure 4:
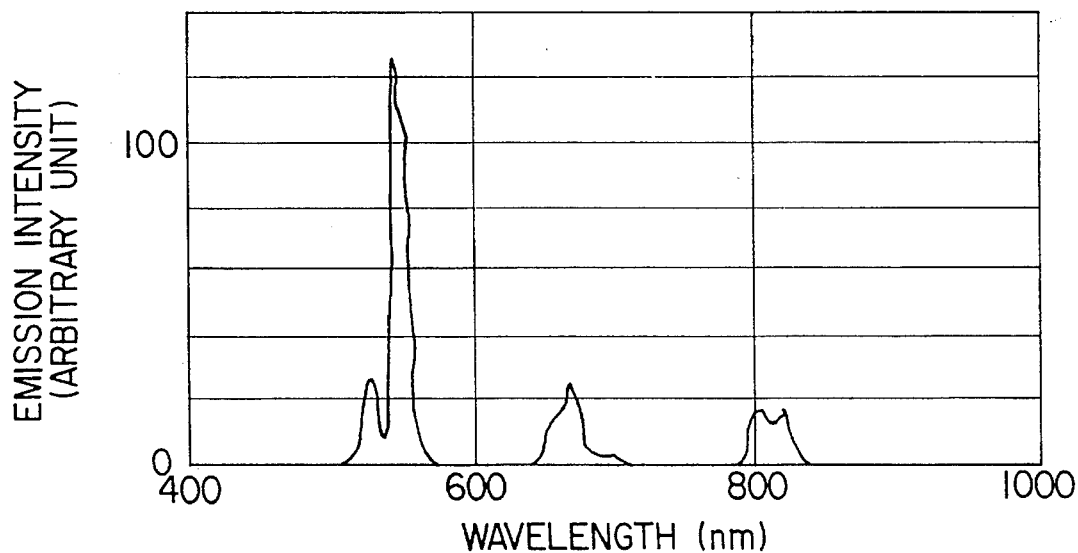
FIG. 4 is an emission spectrum of Example 2 of the infrared-to-visible up-conversion material according to the present invention.

An infrared-to-visible up-conversion material was prepared in an analogous manner to Example 1 except using a material composition of $ErCl_3$: $YCl_3$: $BaCl_2$: $NaCl_2=$ 20:15:30:35 mol % and was excited by an LD light of 1.5 μm (power of 5 mW) to obtain an emission spectrum shown in FIG. 4 at that time. In this example, similar advantages to Example 1 were also obtained and the peak intensity of 520–550 nm in the emission spectrum in FIG. 4 was enhanced by about 2 times or more as large as the same peak intensity of the prior art article of FIG. 2.

EXAMPLE 3

Figure 5:
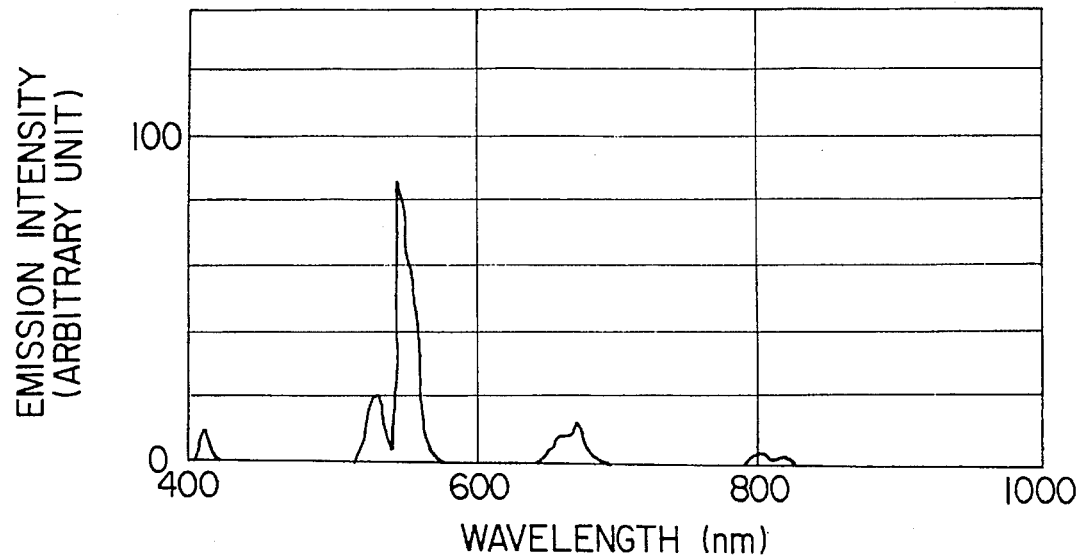
FIG. 5 is an emission spectrum of Example 3 of the infrared-to-visible up-conversion material according to the present invention.

An infrared-to-visible up-conversion material was prepared in an analogous manner to Example 1 except using a material composition of $ErCl_3$: $YCl_3$: $BaCl_2$ =30:40:30 mol % and was excited by an LD light of 1.5 μm (power of 5 mW) to obtain an emission spectrum shown in FIG. 5 at that time. In this example, similar advantages to Example 1 were also obtained and the peak intensity of 520–550 nm in the emission spectrum in FIG. 5 was enhanced by about 1.5 times or more as large as the same peak intensity of the prior art article of FIG. 2.

EXAMPLE 4

Figure 6:
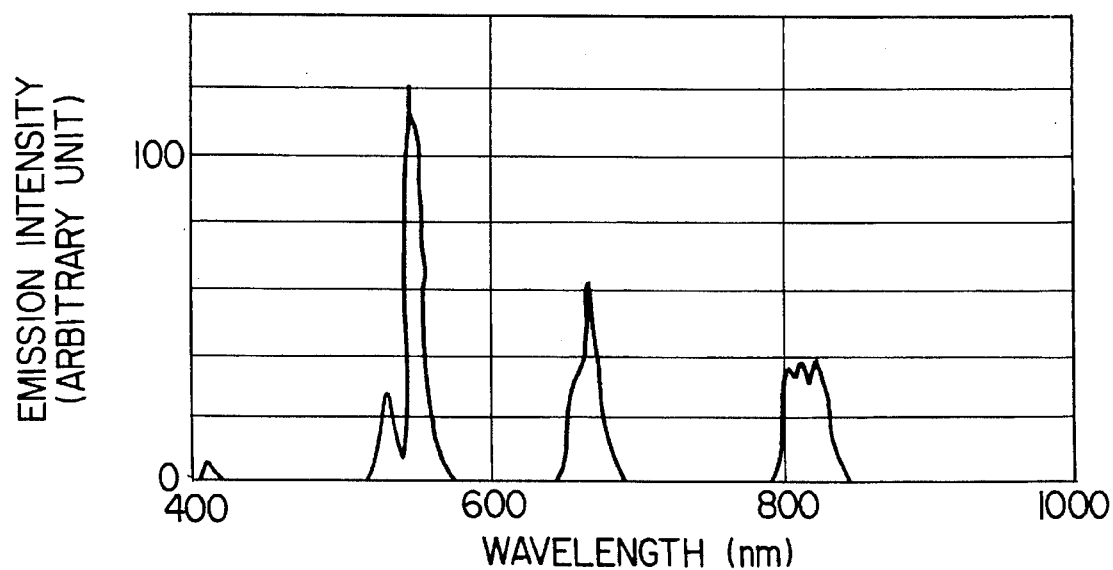
FIG. 6 is an emission spectrum of Example 4 of the infrared-to-visible up-conversion material according to the present invention.

An infrared-to-visible up-conversion material was prepared in an analogous manner to Example 1 except using a material composition of $ErCl_3$: $YCl_3$: KCl: AgCl= 20:20:30:30 mol % and was excited by an LD light of 1.5 μm (power of 5 mW) to obtain an emission spectrum shown in FIG. 6 at that time. In this example, similar advantages to Example 1 were also obtained and the peak intensity of 520–550 nm in the emission spectrum in FIG. 6 was enhanced by about 2 times or more as large as the same peak intensity of the prior art article of FIG. 2.

EXAMPLE 5

Figure 7:
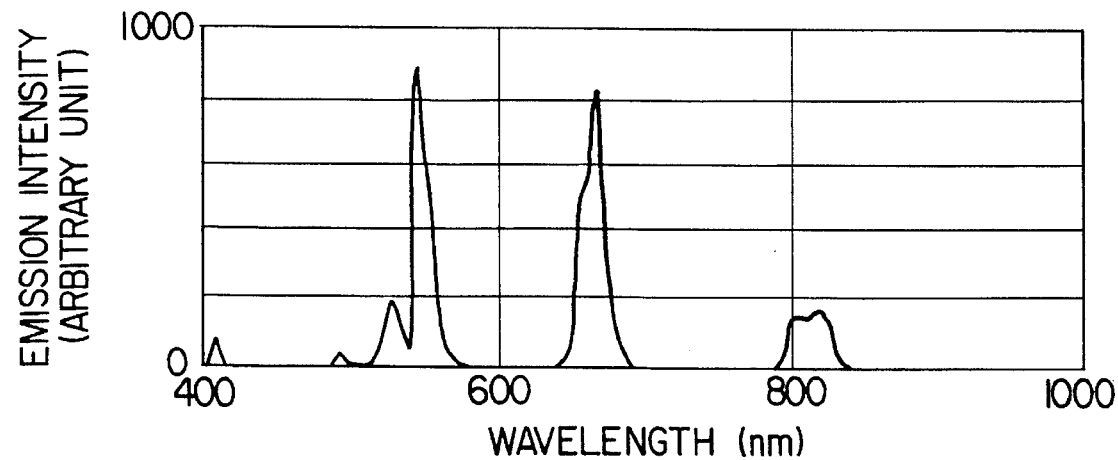
FIG. 7 is an emission spectrum of Example 5 of the infrared-to-visible up-conversion material according to the present invention.

An infrared-to-visible up-conversion material was prepared in an analogous manner to Example 1 except using a material composition of $ErCl_3$: $YCl_3$: $PbCl_2$ :KCl= 20:20:35:25 mol % and was excited by an LD light of 1.5 μm (power of 5 mW) to obtain an emission spectrum shown in FIG. 7 at that time. In this example, similar advantages to Example 1 were also obtained and the peak intensity of 520–550 nm in the emission spectrum in FIG. 7 was enhanced by about 16 times or more as large as the same peak intensity of the prior art article of FIG. 2. At this time, the peak intensity of 650–670 nm was also enhanced.

EXAMPLE 6

Figure 8:
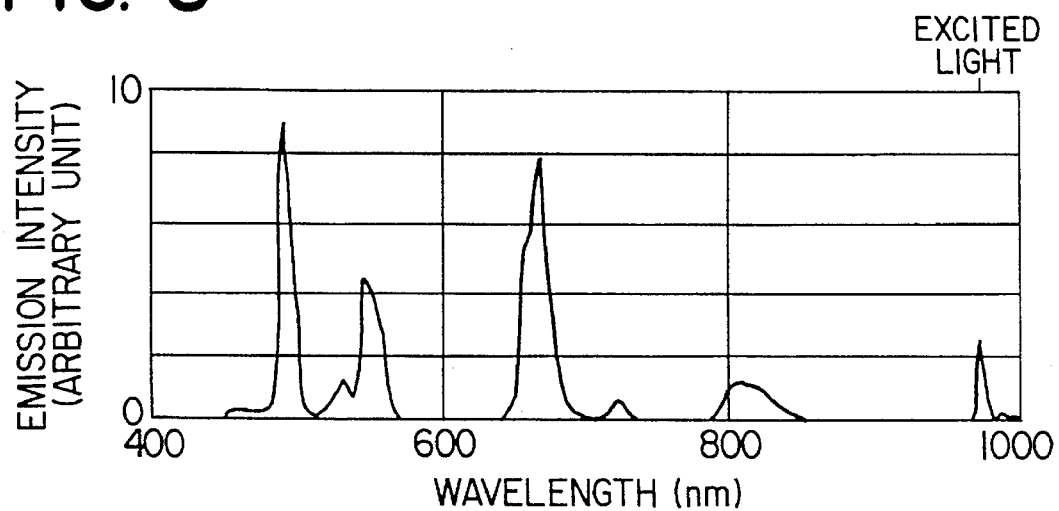
FIG. 8 is an example of an emission spectrum when Example 6 of the infrared-to-visible up-conversion material of the present invention is excited by an infrared light of wavelength 0.98 μm.
Figure 9:
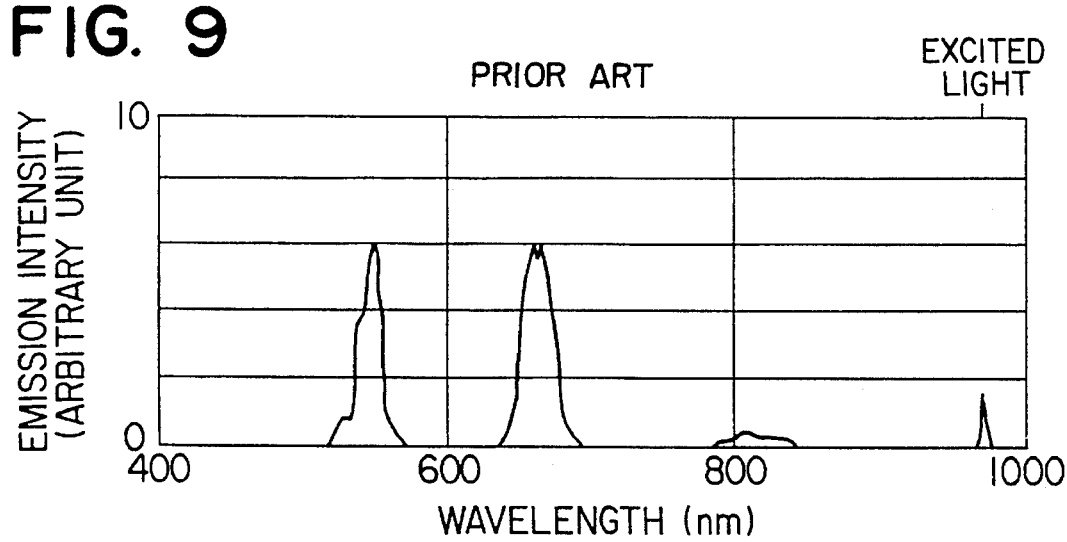
FIG. 9 is an example of an emission spectrum when a commercially available infrared-to-visible up-conversion material of the prior art is irradiated by an infrared light of wavelength 0.98 μm band.

An infrared-to-visible up-conversion material was prepared in an analogous manner to Example 1 except using a material composition of $ErCl_3$: $YCl_3$: $PbCl_2$:

KCl=20:20:35:25 mol % and was excited by an LD light of 0.98 μm (power of 5 mW) to obtain an emission spectrum shown in FIG. 8 at that time. The emission spectrum of a commercially available article by the same measurement method is shown in FIG. 9. In comparison of the emission spectrum of FIG. 8 according to the present invention with that of FIG. 9, the peak intensity of 520–550 nm is decreased and the peak intensity of 650–670 nm is increased. The more characteristic matter is that the strongest peak is observed at 496 nm, which is not observed in FIG. 9. This emission is due to the transition of Er (3+) ion, $^4F_{7/2} \rightarrow {}^4I_{15/2}$. In the prior art material, the emission components at the shorter wavelengths were up to green, while in this Example, a blue-green strong emission was obtained at the higher energy side. Thus, in the case of the 0.98 μm excitation, the energy conversion efficiency was larger than that of the prior art material.

In the case of the 0.98 μm excitation, the excitation was carried out in two stages of $^4I_{15/2} \rightarrow {}^4I_{11/2} \rightarrow {}^4F_{7/2}$. The reason for observation of the strong peak at 496 nm is presumed as follows. That is, in the chloride material of the present invention, the phonon energy of the matrix is smaller than the oxide or fluoride materials of the prior art and it is thus considered that the non-radiative transition of from the excited level to the just under level ($^4F_{7/2} \rightarrow {}^2H_{11/2}$) is hard to occur and the lifetime at the excited level is lengthened, so that the emission transition of $^4F_{7/2} \rightarrow {}^4I_{15/2}$ occurs.

EXAMPLE 7

Figure 10:
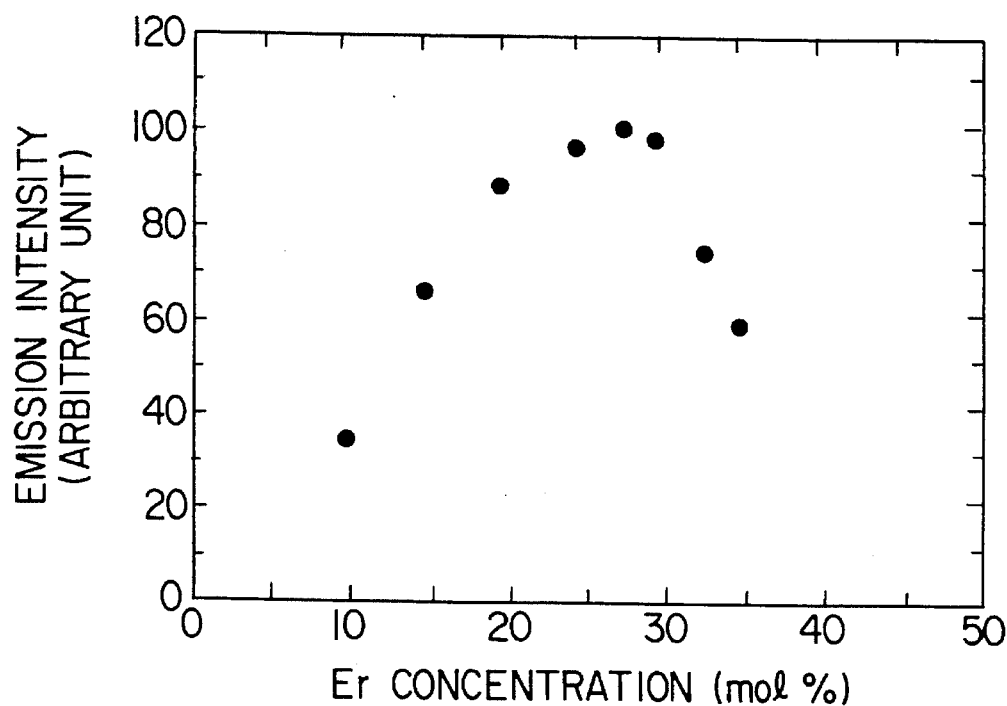
FIG. 10 is a graph showing the relationship between the peak intensity at 540–550 nm and Er concentration when the infrared-to-visible up-conversion material of the present invention is excited by an infrared light of wavelength 1.5 μm.

An infrared-to-visible up-conversion material was prepared in an analogous manner to Example 1 except using a material composition of $ErCl_3$: $BaCl_2$=x: (100-x) mol % and was excited by an LD light of 1.5 μm (power of 5 mW) to obtain an emission spectrum, in which the relationship between the peak intensity at 540–550 nm and x is shown in FIG. 10. The peak intensity substantially reaches the maximum value at x=20–30 and the peak intensity at x=28 is enhanced by at least 40 times as large as that of FIG. 2.

Figure 11:
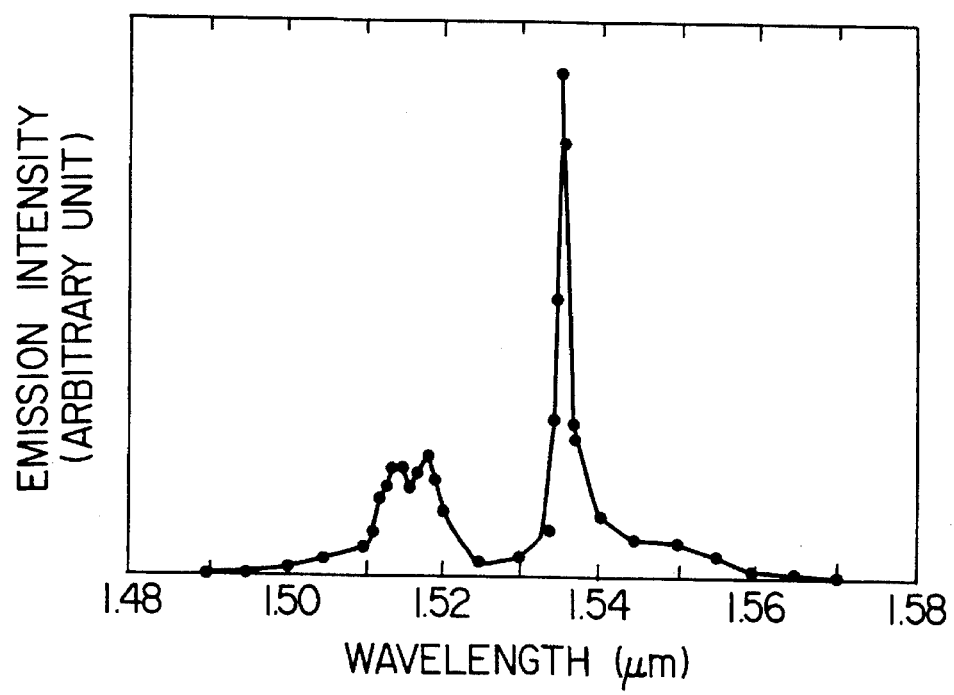
FIG. 11 is an example of an excited spectrum in the wavelength of 1.5 μm band of the infrared-to-visible up-conversion material of the present invention.

The excitation spectrum (emission wavelength: 540–550 nm) of the material of this Example, measured by the use of a wavelength variable LD, is shown in FIG. 11. The excitation peak is at 1.5355 μm and this wavelength is substantially in agreement with the maximum gain wavelength (1.536 μm) of EDFA (Er dope fiber amp).

EXAMPLE 8

Figure 12:
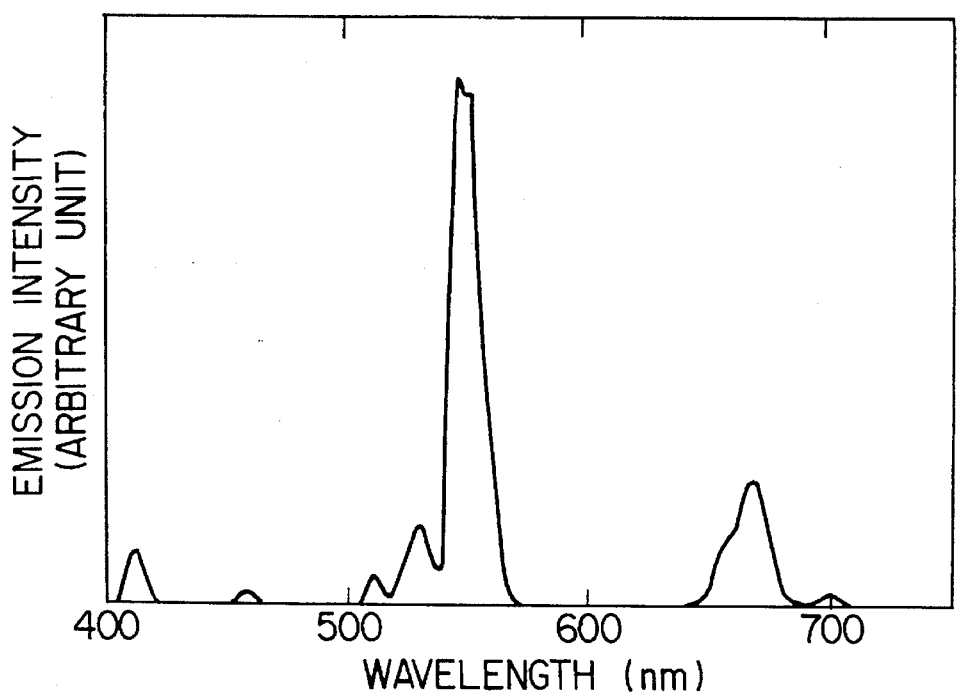
FIG. 12 is an example of an emission spectrum obtained when the infrared-to-visible up-conversion material of the present invention is excited by an infrared light of wavelength 0.8 μm.
Figure 13:
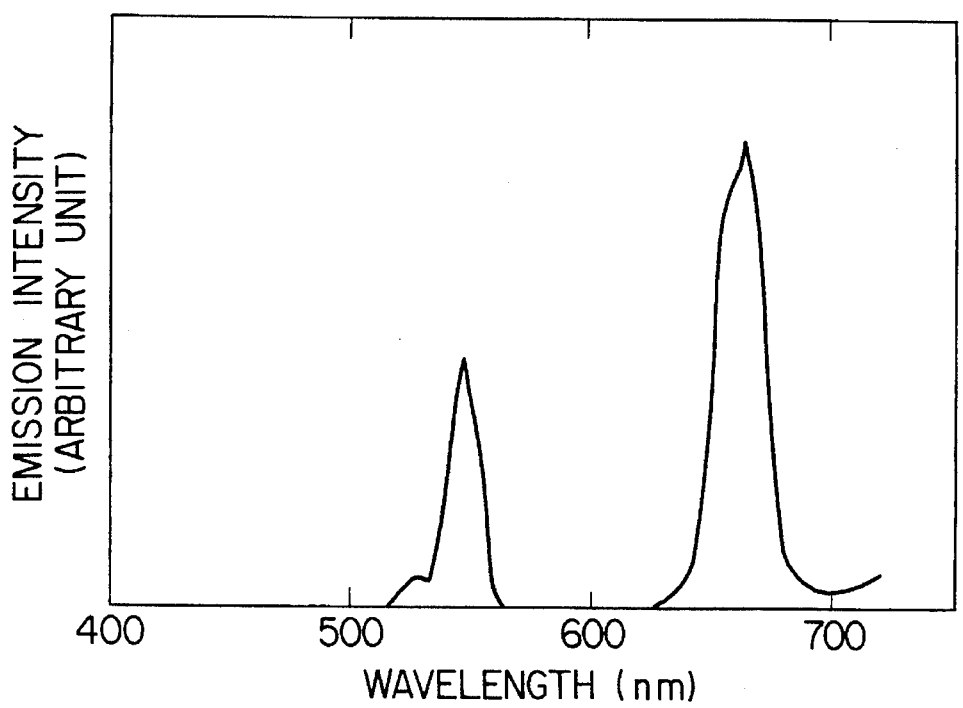
FIG. 13 is an example of an emission spectrum obtained when an infrared-to-visible up-conversion material used in a commercially available IR sensor card (IR Catcher-Mark 2 —commercial name—made by Tokin Corp.) is irradiated by an infrared light of wavelength 0.8 μm band.

An infrared-to-visible up-conversion material was prepared in an analogous manner to Example 1 except using a material composition of $ErCl_3$: $BaCl_2$=25: 75 mol % and was excited by an LD light of 0.8 μm (power of 75 mW) to obtain an emission spectrum shown in FIG. 12. The emission spectrum of a commercially available article by the same measurement method is shown in FIG. 13. The ordinate of FIG. 13 is enlarged by 100 times as large as that of FIG. 12. The peak intensity of 540–550 nm in FIG. 12 is enhanced by about 180 times or more as large as the same peak intensity of FIG. 13.

Figure 14:
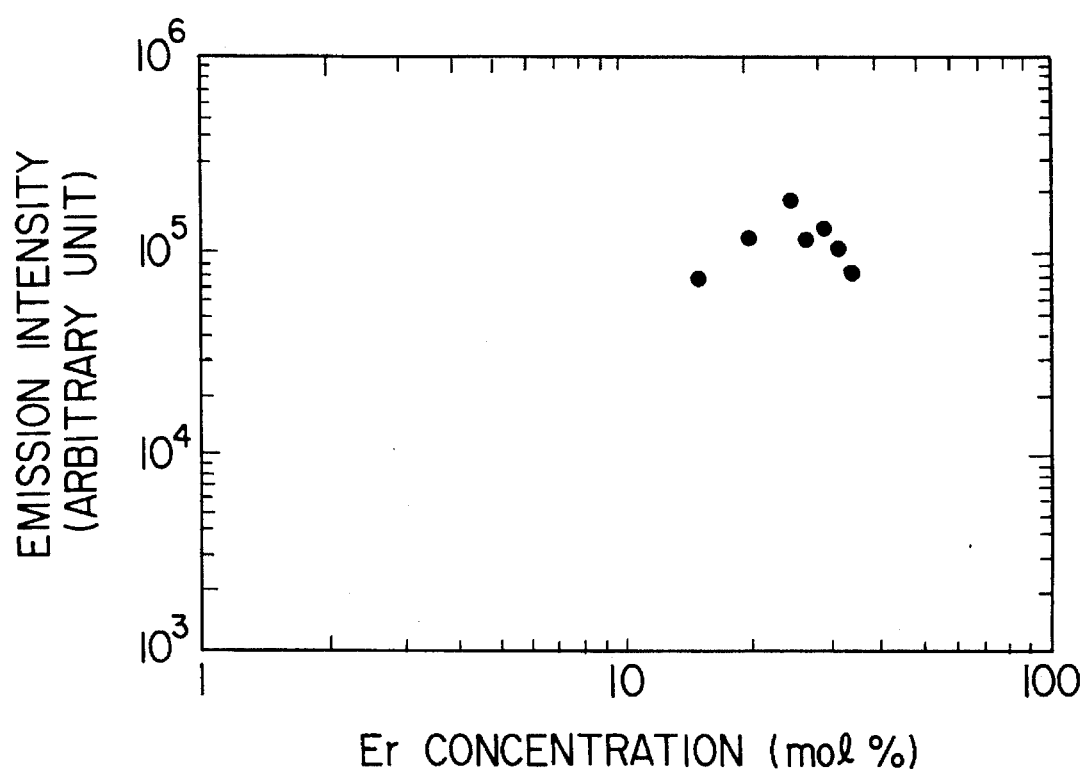
FIG. 14 is a graph showing the relationship between the peak intensity at 540–550 nm and Er concentration when the infrared-to-visible up-conversion material of the present invention is excited by an infrared light of wavelength 0.8 μm.

An infrared-to-visible up-conversion material was prepared using a material composition of $ErCl_3$: $BaCl_2$=x:(100-x) mol % and was excited by an LD light of 0.8 μm (power of 75 mW) to obtain an emission spectrum, in which the relationship between the peak intensity at 540–550 nm and x is shown in FIG. 14. At x=20–20, the peak intensity is substantially maximum.

In the chloride type material of the present invention, a strong emission peak was similarly observed at 496 nm by the excitation of 0.98 μm even if other compositions were used.

EXAMPLE 9

One embodiment of an infrared-to-visible up-conversion material comprising $ErBr_3$ and $YBr_3$ in a proportion of 30: 70 mol % will be given.

The above described material was prepared by the following procedure.

Commercially available powdered reagents, $ErBr_3$ and $YBr_3$ (all powders being of at least 3N) were weighed in a predetermined proportion, pulverized in a mortar and simultaneously stirred and mixed. The resulting mixed powders was charged in a crucible of glassy carbon and charged in an electric furnace maintained at 650° C., the temperature of the electric furnace being raised. The mixture was maintained at a calcination temperature of 950° C. for 1 hour and adequately reacted, the temperature being gradually lowered at a rate of 5° C./min. When the furnace temperature was lowered to about 650° C., the reaction mixture was taken as a sample. During the calcination, $N_2$ or Ar gas was always was flowed in the furnace to maintain an atmosphere to prevent mixing of oxygen or moisture. In order to prevent the raw material from oxidation due to contacting with oxygen or moisture, all the procedures of weighing of the reagents, preparation, melting and sintering were carried out in an $N_2$ or Ar gas atmosphere. As the crucible, there could be used those of quartz, platinum or gold in addition to that of glassy carbon.

Figure 15:
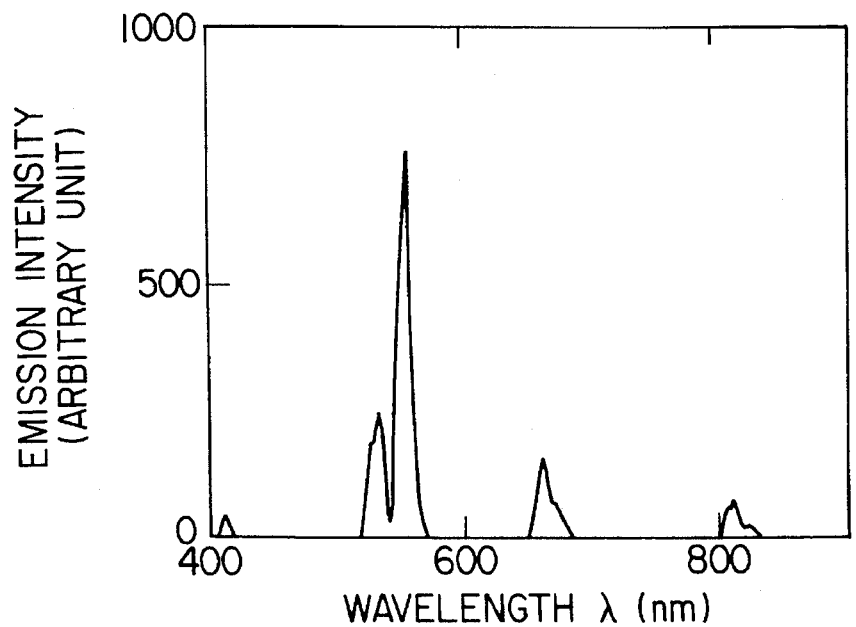
FIG. 15 is an emission spectrum obtained when the infrared-to-visible up-conversion material of Example 9 is irradiated by an LD light of wavelength 1.5 μm.
Figure 16:
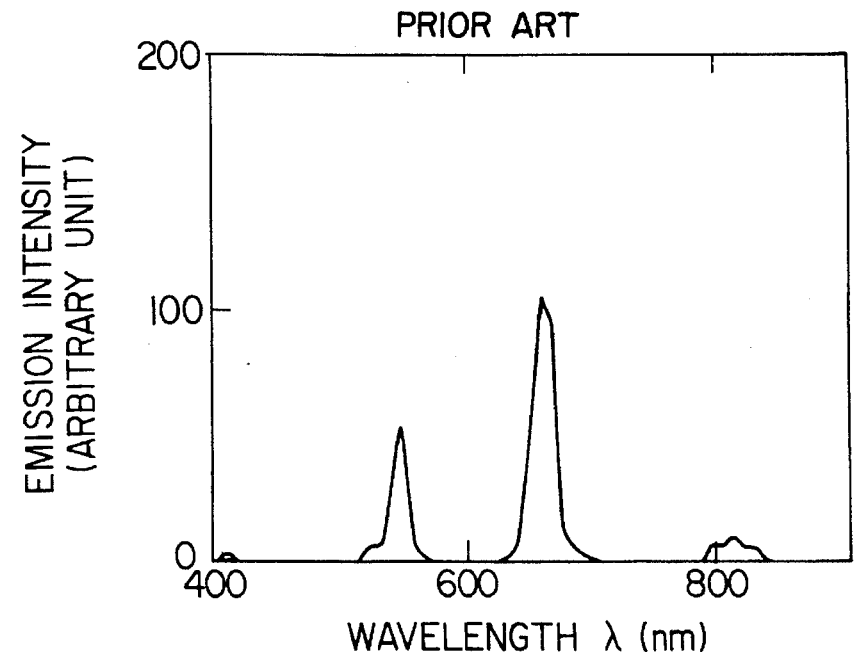
FIG. 16 is an emission spectrum obtained when an infrared-to-visible up-conversion material used in a commercially available article (IR Catcher-Mark II, made by Tokin Corp.) is irradiated by an LD light of wavelength 1.5 μm band.

The thus prepared infrared-to-visible up-conversion material was excited by an LD light of 1.5 μm (power of 5 mW) to obtain an emission spectrum shown in FIG. 15. The emission peak wavelengths were 405–415 nm, 520–550 nm, 650–670 nm and 790–830 nm. Above all, an emission intensity of 520–550 nm was strongest and seen as green by the naked eye. On the other hand, an infrared-to-visible up-conversion material ($Er^{3+}$containing fluoride) used in a commercially available article (IR Catcher-Mark II —commercial name—made by Tokin Corp.) was similarly irradiated by an LD light of wavelength 1.5 μm band to obtain an emission spectrum shown in FIG. 16. In FIG. 16, the ordinate is enlarged by 5 times as large as that of FIG. 15, but it will be understood that in comparison of the emission spectra of FIG. 15 and FIG. 16, all the emission peak intensities in the visible range of 405–415 nm, 520–550 nm and 650–670 nm corresponding to the emission spectrum shown in FIG. 15 are increased. FIG. 3 shows a 4f electron energy level of Er (3+) ion. In the emission spectra shown in FIG. 15 and FIG. 16, each of the peaks at 410 nm, 530 nm, 545 nm, 660 nm and 810 nm is an emission by the radiative transition from the excited level of 4f electron of Er (3+) ion to the ground level, i.e. $^2H_{9/2} \rightarrow {}^4I_{15/2}$, $^2H_{11/2} \rightarrow {}^4I_{15/2}$, $^4S_{3/2} \rightarrow {}^4I_{15/2}$, $^4F_{9/2} \rightarrow {}^4I_{15/2}$ and $^4F_{9/2} \rightarrow {}^4I_{15/2}$. The peak intensity of 520–550 nm in the emission spectrum in FIG. 15 is enhanced by about 13 times as large as the same peak intensity of FIG. 16.

An example of the mechanism which is considered as a 545 nm emission process by irradiation of an infrared light of 1.5 μm band will be shown in the following. As shown in FIG. 3, there are caused a transition of from the ground level ($^4I_{15/2}$) of 4f electron of $Er^{3+}$ ion to the excited level ($^4I_{13/2}$) and the transition of from the above described excited level to the above described ground level ($^4I_{13/2} \rightarrow {}^4I_{15/2}$) by irradiation of an infrared light of 1.5 µm. During the same time, the transition energy is transferred to another $Er^{3+}$ ion by non-radiation to cause two-stagewise excitation of from the excited level ($^4I_{13/2}$) to the further upper excited level ($^4I_{9/2}$). By the similar energy transfer, three-stagewise excitation is caused from the excited level ($^4I_{9/2}$) of $Er^{3+}$ ion to the further upper excited level ($^2H_{11/2}$). Thus, an emission of 545 nm is obtained by relaxation of from the above described excited level ($^2H_{11/2}$) of $Er^{3+}$ ion to the just below level ($^4S_{3/2}$) through non-radiation and transition of this level to the ground level ($^4S_{3/2} \rightarrow {}^4I_{15/2}$).

Since the bromide material of the present invention has a considerably weaker chemical bond of a cation and anion (Br) and thus a smaller phonon energy of the matrix than the oxide of fluoride materials of the prior art, the non-radiative transition of from the excited emission level to the just below level hardly takes place and the lifetime is lengthened at the excited level, whereby the green emission at 545 nm is rendered stronger as compared with the prior art materials. From this point of view, it can be understood that the emission efficiency of the material of the present invention is increased more than not only oxide materials but also fluoride materials of the prior art.

In this example, the material was prepared by a solid or liquid phase reaction, but when it was prepared by a gaseous phase reaction such as vacuum vapor deposition, sputtering vapor deposition or chemical vapor deposition (CVD), the similar effects were obtained.

EXAMPLE 10

One embodiment of an infrared-to-visible up-conversion material comprising $ErBr_3$, $YBr_3$ and KBr in a proportion of 30:30:40 mol % will be given.

Preparation of the sample was carried out in an analogous manner to Example 9.

Figure 17:
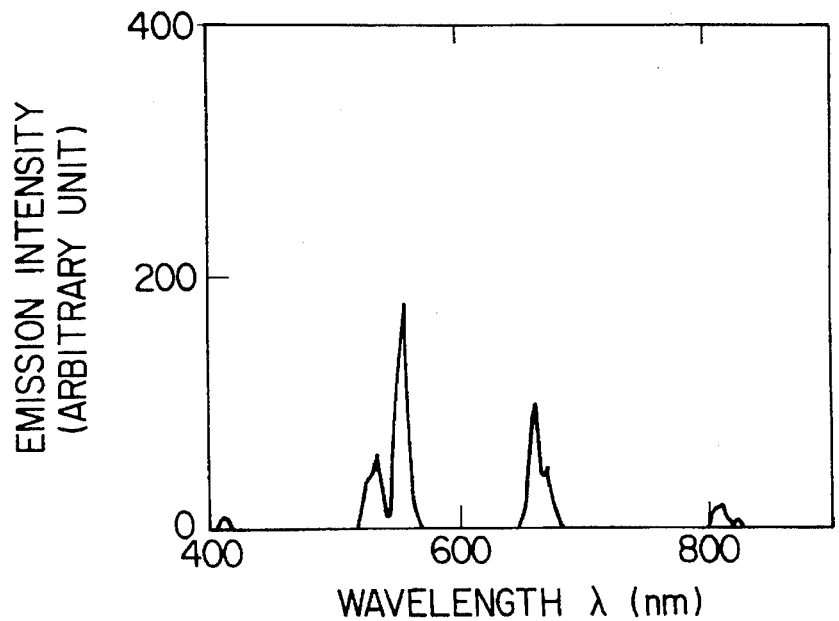
FIG. 17 is an emission spectrum obtained when the infrared-to-visible up-conversion material of Example 10 is irradiated by an LD light of wavelength 1.5 μm band.

The resulting sample was excited by an LD light (5mW) of a wavelength of 1.5 µm band to obtain an emission spectrum shown in FIG. 17. In this example, similar advantages to Example 9 were also obtained and the peak intensity of 520–550 in the emission spectrum in FIG. 17 was enhanced by about 2 times or more as large as the same peak intensity of FIG. 16. On the other hand, the peak intensity of 650–670 nm was slightly decreased.

Of these emission peaks, the intensity at which humans sensi is bright (spectral luminous efficacy) is, for 100 at a wavelength of 555 nm, about 97.5 at 520–550 nm and about 6.5 at 650–670 nm. This means that the human eye has a 15 times higher spectral luminous efficacy at 520–550 nm than at 650–670 nm and briefly teaches that when the emission intensity at 520–550 nm is enhanced by 2 times, a similar brightness can be felt even if the emission intensity at 650–670 nm is lowered to 1/30. Therefore, the increase of the emission peak intensity at 520–550 nm more than makes up for the decrease of that at 650–670 nm.

EXAMPLE 11

One embodiment of an infrared-to-visible up-conversion material comprising $ErBr_3$, KBr, $PbBr_2$ and $YCl_3$ in a proportion of 20:30:30:20 mol % will be given. Preparation of the sample was carried out in an analogous manner to Example 9.

Figure 18:
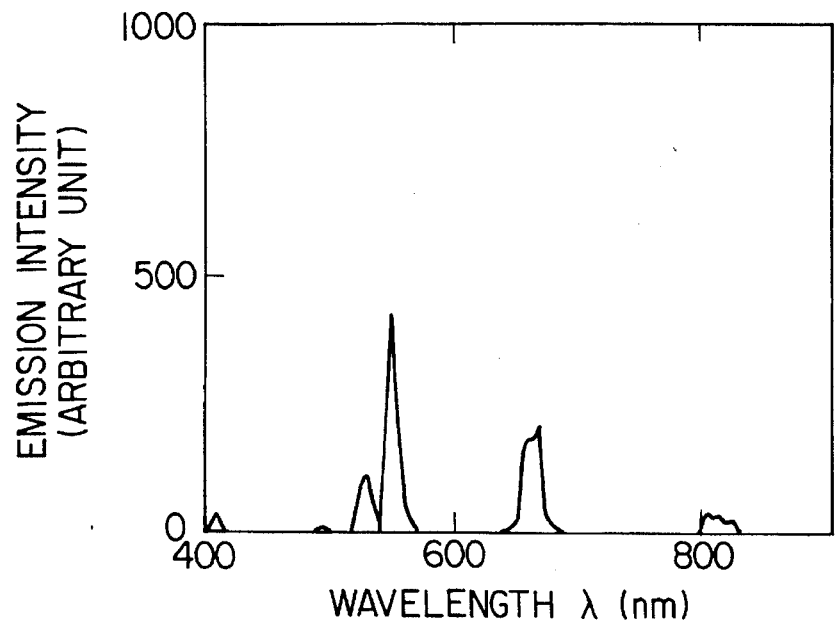
FIG. 18 is an emission spectrum obtained when the infrared-to-visible up-conversion material of Example 11 is irradiated by an LD light of wavelength 1.5 μm band.

The resulting sample was excited by an LD light (5 mW) of a wavelength of 1.5 µm band to obtain an emission spectrum shown in FIG. 18. In this example, similar advantages to Example 9 were also obtained and the peak intensities of 520–550 nm and 650–670 nm in the emission spectrum in FIG. 18 were respectively enhanced by about 8 times and about 2 times as large as the same peak intensity of FIG. 16.

EXAMPLE 12

Figure 19:
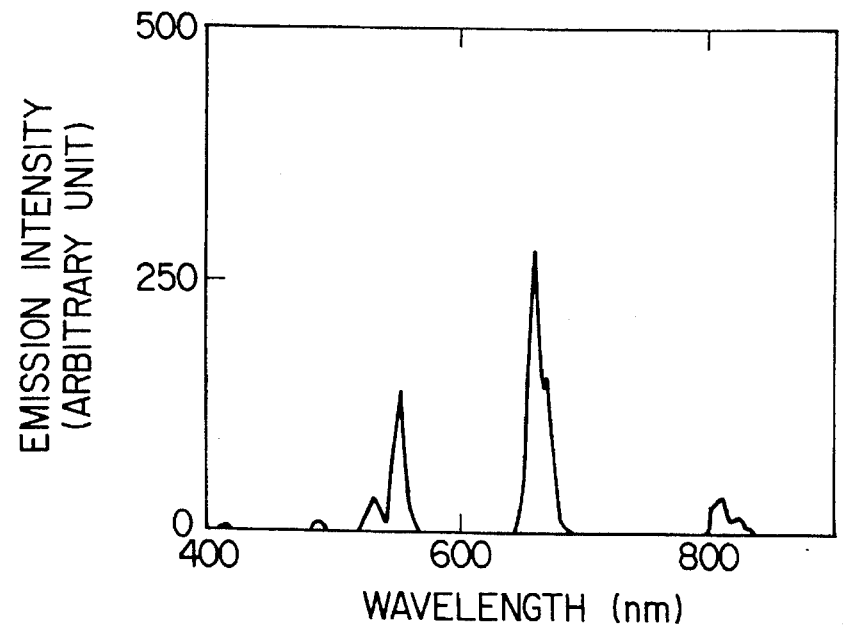
FIG. 19 is an emission spectrum obtained when the infrared-to-visible up-conversion material of Example 12 is irradiated by an LD light of wavelength 1.5 μm band.

$ErBr_3$ used as a raw material of the sample in the foregoing example was excited by an LD light (5 mW) of a wavelength of 1.5 µm band to obtain an emission spectrum shown in FIG. 19. In this example, similar advantages to Example 9 were also obtained and the peak intensities of 520–550 nm and 650–670 nm in the emission spectrum in FIG. 19 were all enhanced by about 2.5 times as large as the same peak intensity of FIG. 16.

EXAMPLE 13

One embodiment of an infrared-to-visible up-conversion material comprising $ErI_3$, $YBr_3$ and CsI in a proportion of 30:20:50 mol % will be given.

The above described material was prepared by the following procedure.

Commercially available powdered reagents, $ErI_3$, $YBr_3$ and CsI (all powders being of at least 99.9%) were weighed in a predetermined proportion, pulverized in a mortar and simultaneously grounded and mixed. The resulting mixed powder was then charged in a crucible of glassy carbon and charged in an electric furnace maintained at 650° C., the temperature of the electric furnace being raised. The mixture was maintained at a calcination temperature of 950° C. for 1 hour and adequately reacted, the temperature being gradually lowered at a rate of 5° C./min. When the furnace temperature was lowered to about 650° C., the reaction mixture was taken as a sample. During the calcination, $N_2$ or Ar gas was always flowed in the furnace to maintain an atmosphere to prevent mixing of oxygen or moisture. In order to prevent the raw material from oxidation due to contacting with oxygen or moisture, all the procedures of weighing of the reagents, preparation, melting and sintering were carried out in an $N_2$ or Ar gas atmosphere. As the crucible, there could be used those of quartz, platinum or gold in addition to that of glassy carbon.

Figure 20:
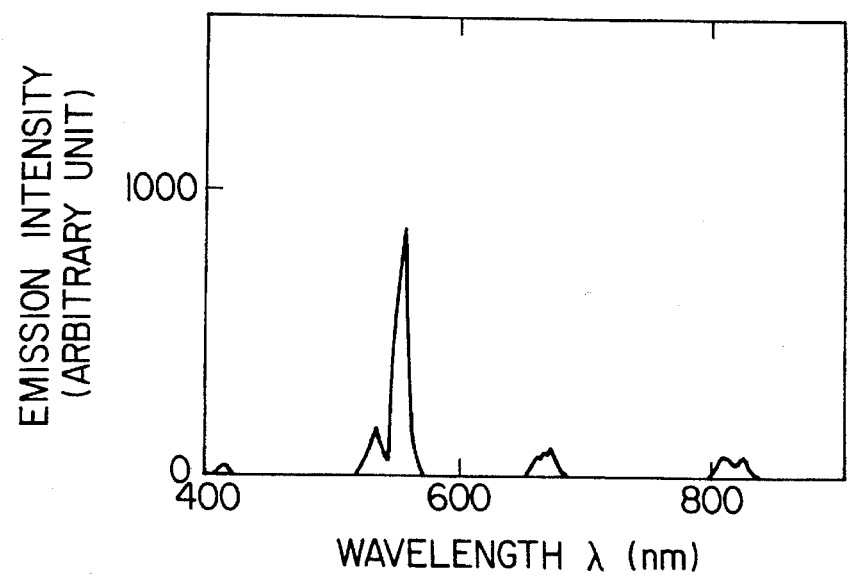
FIG. 20 is an emission spectrum obtained when the infrared-to-visible up-conversion material of Example 13 is irradiated by an LD light of wavelength 1.5 μm band.
Figure 21:
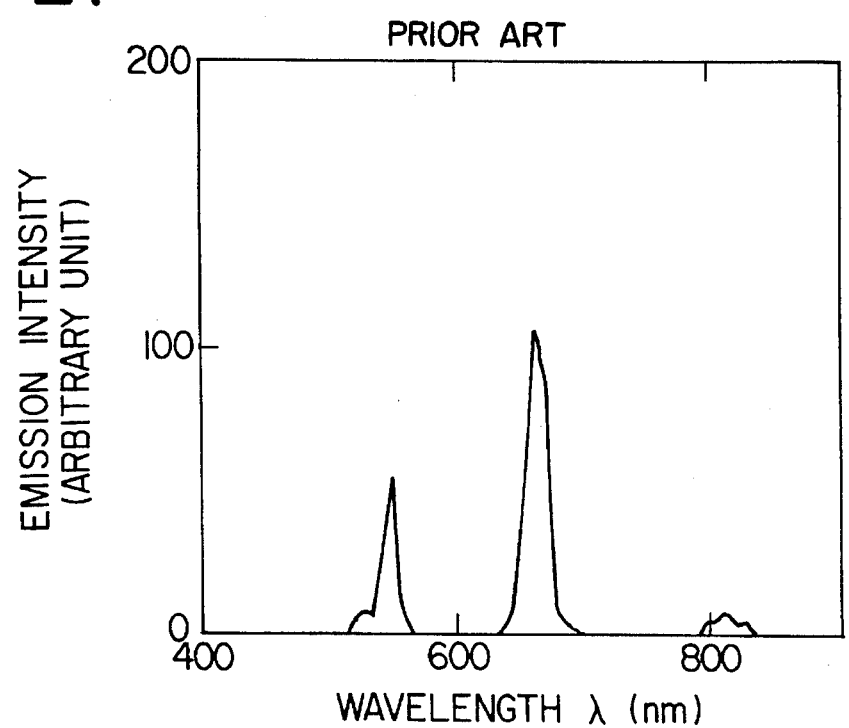
FIG. 21 is an emission spectrum obtained when the infrared-to-visible up-conversion material used in a commercially available article (IR Catcher-Mark II, made by Tokin Corp.) is irradiated by and LD light of wavelength 1.5 μm band.

The thus prepared infrared-to-visible up-conversion material was excited by an LD light of 1.5 µm (power of 5 mW) to obtain an emission spectrum shown in FIG. 20. The emission peak wavelengths were 405–415 nm, 520–550 nm, 650–670 nm and 790–830 nm. Above all, an emission intensity of 520–550 nm, was the strongest and seen as green fluorescence by the naked eye. On the other hand, an infrared-to-visible up-conversion material ($Er^{3+}$—containing fluoride) used in a commercially available article (IR Catcher-Mark II —commercial name—made by Tokin KK) was similarly irradiated by an LD light of wavelength 1.5 µm band to obtain an emission spectrum shown in FIG. 21. In FIG. 21, the ordinate is enlarged by 5 times as large as that of FIG. 20, but it will be understood that in comparison of the emission spectra of FIG. 20 and FIG. 21, the emission peak intensities at 405–415 nm and 520–550 nm in the emission spectrum shown in FIG. 20 are increased and the emission peak intensity at 650–670 nm is somewhat decreased.

Of these emission peaks, the intensity at which humans sense is bright (spectral luminous efficacy) is, for 100 at a wavelength of 555 nm, about 97.5 at 520–550 nm and about 6.5 at 650–670 nm. This means that the human eye has a 15 times higher spectral luminous efficacy at 520–550 nm than at 650–670 nm and briefly teaches that when the emission intensity at 520–550 nm is enhanced by 2 times, a similar brightness can be felt even if the emission intensity at 650–670 nm is lowered to 1/30. Therefore, the increase of the emission peak intensity at 520–550 nm more than makes up for the decrease of that at 650–670 nm. It will clearly be understood from this result that the infrared-to-visible up-conversion material of this Example exhibits a much higher conversion efficiency in the up-conversion of wavelengths of 1.5 μm band to the visible range than the prior art materials.

FIG. 3 shows a 4f electron energy level of $Er^{3+}$ ion. In the emission spectra shown in FIG. 20 and FIG. 21, each of the peaks at 410 nm, 522 nm, 545 nm, 660 nm and 800 nm is an emission by the radiative transition of from the excited level of 4f electron of $Er^{3+}$ ion to the ground level, i.e. $^2H_{9/2} \rightarrow {}^4I_{15/2}$, $^2H_{11/2} \rightarrow {}^4I_{15/2}$, $^4S_{3/2} \rightarrow {}^4I_{15/2}$, $^4F_{9/2} \rightarrow {}^4I_{15/2}$ and $^4F_{9/2} \rightarrow {}^4I_{15/2}$. The peak intensity of 520–550 nm in the emission spectrum in FIG. 20 is enhanced by about 15 times as large as the same peak intensity of FIG. 21.

An example of the mechanism which is considered as a 545 nm emission process by irradiation of an infrared light of 1.5 μm band will be shown in the following. As shown in FIG. 3, there are caused a transition of from the ground level ($^4I_{15/2}$) of 4f electron of $Er^{3+}$ ion to the excited level ($^4I_{13/2}$) and the transition of from the above described excited level to the above described ground level ($^4I_{13/2} \rightarrow {}^4I_{15/2}$) by irradiation of an infrared light of 1.5 μm. During the same time, the transition energy is transferred to another $Er^{3+}$ ion by non-radiation to cause two-stagewise excitation of from the excited level ($^4I_{13/2}$) to the further upper excited level ($^4I_{9/2}$). By the similar energy transfer, three-stagewise excitation is caused from the excited level ($^4I_{9/2}$) of $Er^{3+}$ ion to the further upper excited level ($^2H_{11/2}$). Thus, an emission of 545 nm is obtained by relaxation of from the above described excited level ($^2H_{11/2}$) of $Er^{3+}$ ion to the just below level ($^4S_{3/2}$) through non-radiation and transition of this level to the ground level ($^4S_{3/2} \rightarrow {}^4I_{15/2}$).

Since the iodide material of the present invention has a considerably weaker chemical bond of a cation and anion (I) and thus a smaller phonon energy of the matrix than the oxide or fluoride materials of the prior art, the non-radiative transition of from the excited emission level to the just below level hardly takes place and the lifetime is lengthened at the excited level, where by the green emission at 545 nm is rendered stronger as compared with the prior art materials. From this point of view, it can be understood that the emission efficiency of the material of the present invention is increased more than not only oxide materials but also fluoride materials of the prior art.

In this example, the material was prepared by a solid or liquid phase reaction, but when it was prepared by a gaseous phase reaction such as vacuum vapor deposition, sputtering vapor deposition or chemical vapor deposition (CVD), the similar effects were obtained.

EXAMPLE 14

One embodiment of an infrared-to-visible up-conversion material comprising $ErI_3$, $YI_3$ and $CsI$ in a proportion of 50:30:20 mol % will be given.

Preparation of the sample was carried out in an analogous manner to Example 13.

Figure 22:
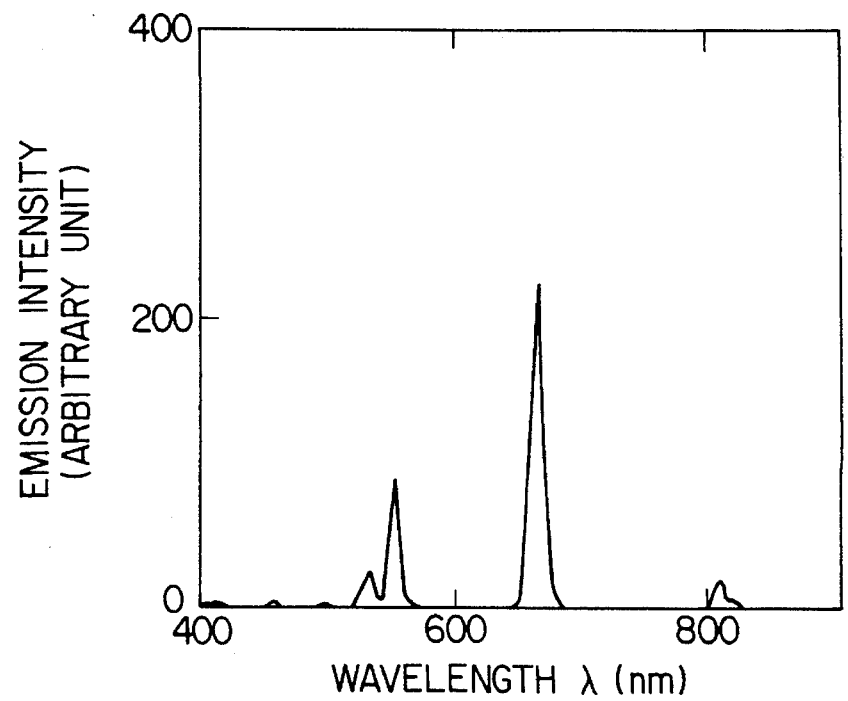
FIG. 22 is an emission spectrum obtained when the infrared-to-visible up-conversion material of Example 14 is irradiated by an LD light of wavelength 1.5 μm band.

The resulting sample was excited by an LD light (5 mW) of a wavelength of 1.5 μm band to obtain an emission spectrum shown in FIG. 22. In this example, similar advantages to Example 13 were also obtained and the peak intensities of 520–550 nm and 650–670 nm in the emission spectrum in FIG. 22 were respectively enhanced by about 1.5 times and about 2 times as large as the same peak intensity of FIG. 21.

EXAMPLE 15

One embodiment of an infrared-to-visible up-conversion material comprising $ErI_3$ and $YI_3$ in a proportion of 20:80 mol % will be given. Preparation of the sample was carried out in an analogous manner to Example 13.

Figure 23:
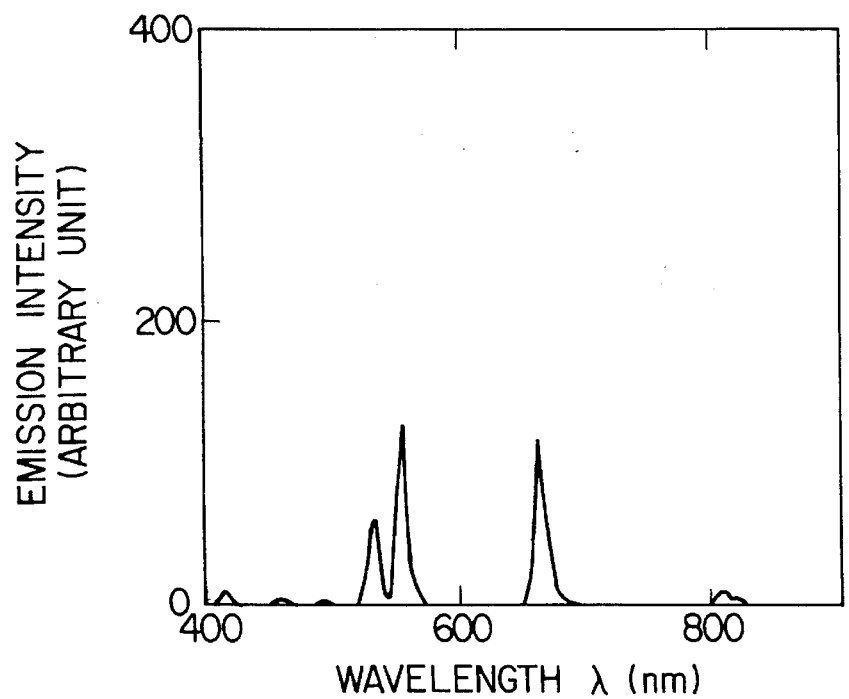
FIG. 23 is an emission spectrum obtained when the infrared-to-visible up-conversion material of Example 15 is irradiated by an LD light of wavelength 1.5 μm band.

The resulting sample was excited by an LD light (5 mW) of 1.5 μm to obtain an emission spectrum shown in FIG. 23. In this example, similar advantages to Example 13 were also obtained and the peak intensity of 520–550 nm in the emission spectrum in FIG. 23 was enhanced by about 2 times as large as the same peak intensity of FIG. 21.

EXAMPLE 16

One embodiment of an infrared-to-visible up-conversion material comprising $ErI_3$, $YI_3$ and $KBr$ in a proportion of 30:30:40 mol % will be given.

Preparation of the sample was carried out in an analogous manner to Example 13.

Figure 24:
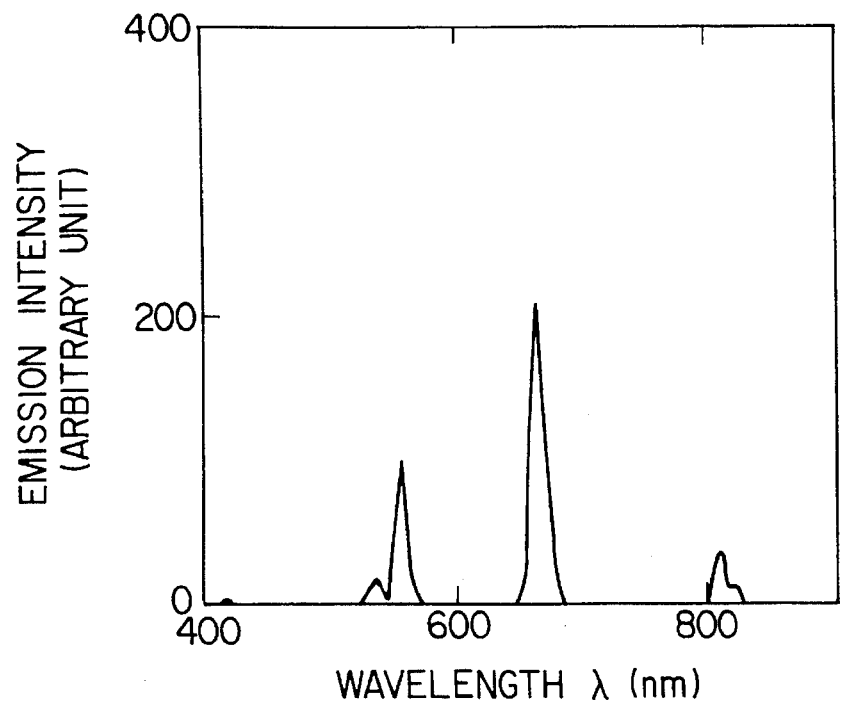
FIG. 24 is an emission spectrum obtained when the infrared-to-visible up-conversion material of Example 16 is irradiated by an LD light of wavelength 1.5 μm band.

The resulting sample was excited by an LD light (5 mW) of 1.5 μm to obtain an emission spectrum shown in FIG. 24. In this example, similar advantages to Example 13 were also obtained and the peak intensities of 520–550 nm and 650–670 nm in the emission spectrum in FIG. 24 were respectively enhanced by about 2 times as large as the same peak intensity of FIG. 21.

EXAMPLE 17

One embodiment of an infrared-to-visible up-conversion material comprising $ErI_3$, $YI_3$ and $CsI$ in a proportion of 30:30:40 mol % will be given.

Preparation of the sample was carried out in an analogous manner to Example 13.

Figure 25:
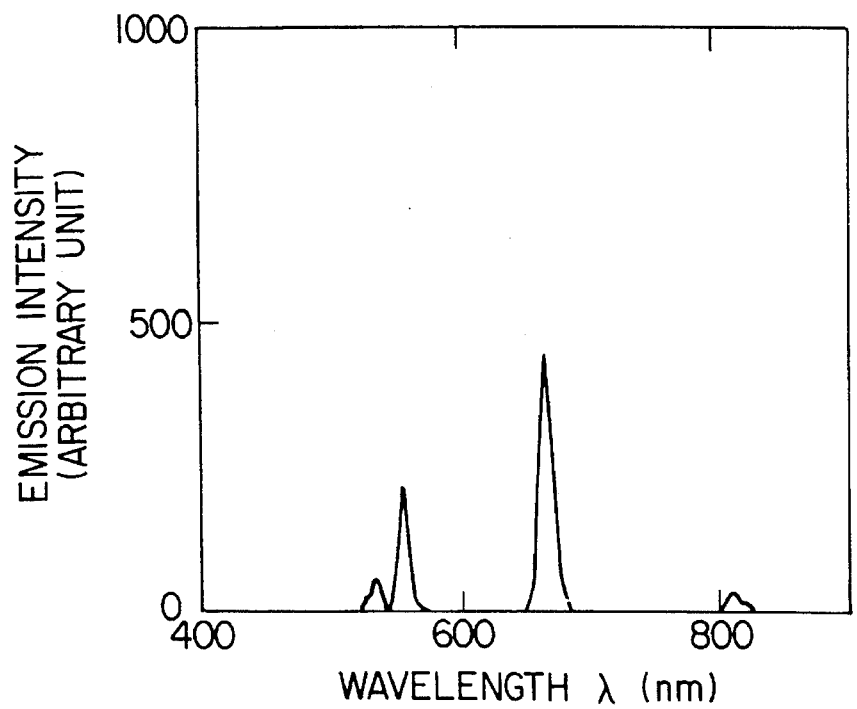
FIG. 25 is an emission spectrum obtained when the infrared-to-visible up-conversion material of Example 17 is irradiated by an LD light of wavelength 1.5 μm band.

The resulting sample was excited by an LD light (5 mW) of 1.5 μm to obtain an emission spectrum shown in FIG. 25. In this example, similar advantages to Example 13 were also obtained and the peak intensities of 520–550 nm and 650–670 nm in the emission spectrum in FIG. 25 were respectively enhanced by about 4 times as large as the same peak intensity of FIG. 21.

EXAMPLE 18

One embodiment of an infrared-to-visible up-conversion material comprising $ErI_3$ and $YI_3$ in a proportion of 40:60 mol % will be given.

Preparation of the sample was carried out in an analogous manner to Example 13.

Figure 26:
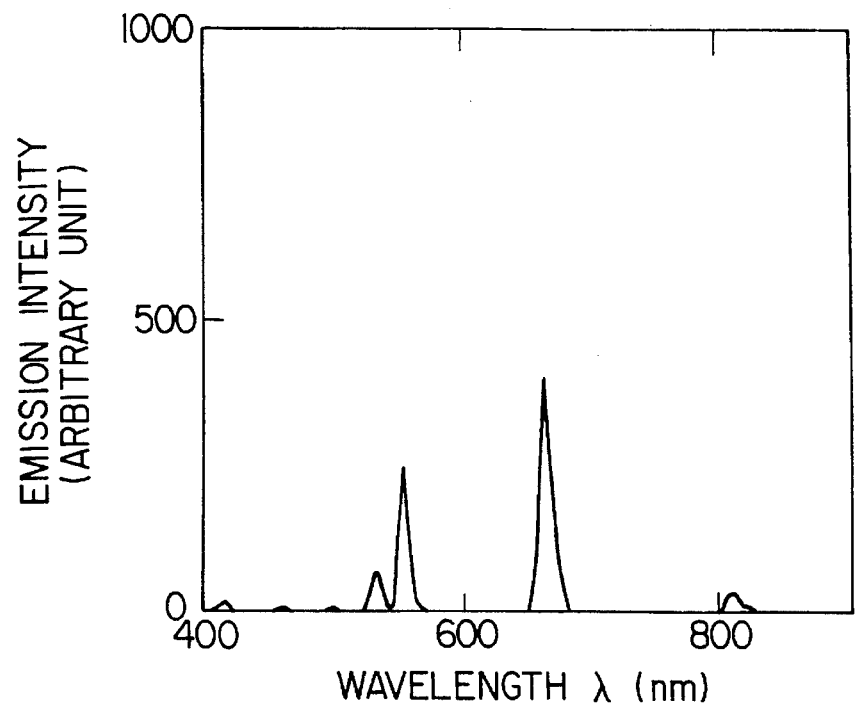
FIG. 26 is an emission spectrum obtained when the infrared-to-visible up-conversion material of Example 18 is irradiated by an LD light of wavelength 1.5 μm band.

The resulting sample was excited by an LD light (5 mW) of 1.5 μm to obtain an emission spectrum shown in FIG. 26. In this example, similar advantages to Example 13 were also obtained and the peak intensities of 520–550 nm and 650–670 nm in the emission spectrum in FIG. 26 were respectively enhanced by about 4 times and about 3.5 times as large as the same peak intensity of FIG. 21.

EXAMPLE 19

Figure 27:
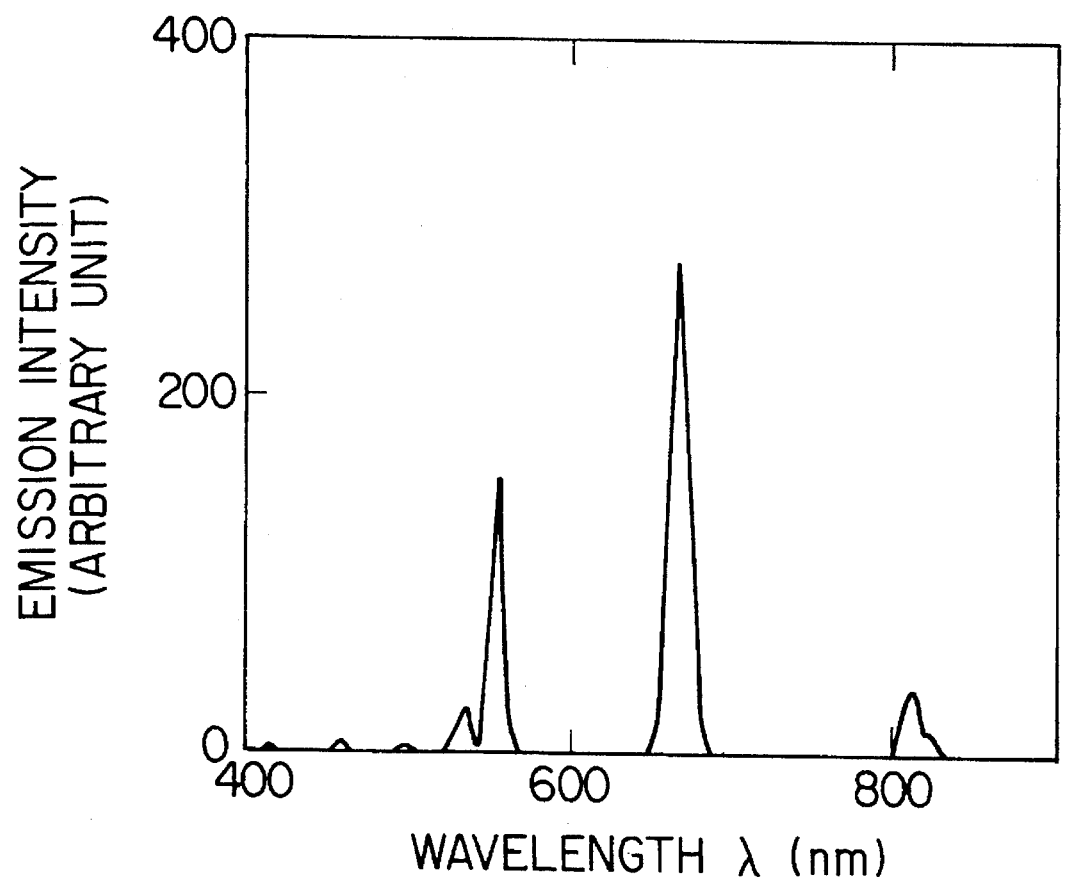
FIG. 27 is an emission spectrum obtained when the infrared-to-visible up-conversion material of Example 19 is irradiated by an LD light of wavelength 1.5 μm band.

$ErI_3$ used as a raw material of the sample in the above described example was excited by an LD light (5 mW) of 1.5 μm to obtain an emission spectrum shown in FIG. 27. In this example, similar advantages to Example 13 were also obtained and the peak intensities of 520–550 nm and 650–670 nm in the emission spectrum in FIG. 27 were all enhanced by about 2.5 times as large as the same peak intensity of FIG. 21.

As is evident from the foregoing illustrations and examples, the infrared-to-visible up-conversion material consisting of an inorganic material comprising at least two elements of erbium (Er) and halogens or compounds thereof according to the present invention is capable of exhibiting a more excellent conversion efficiency than prior art articles and a reradiated light containing spectral components in the visible range by irradiation of infrared lights of 1.5 μm band, etc. and accordingly, it can be applied to an infrared light identification element having a useful conversion efficiency and sensitivity for infrared lights in the wavelengths 1.5 μm band, 0.98 μm band and 0.8 μm band without necessity of previous excitation.

Furthermore, the infrared-to-visible up-conversion material of the present invention has an advantage that the wavelength conversion efficiency of from an irradiated light to the visible light and the visible light emission intensity can be stabilized for a long time.

What is claimed is:

1. An infrared-to-visible up-conversion material capable of emitting luminescence in a range of 520–550 nm and 650–670 nm during irradiation, consisting of an inorganic material consisting essentially of:

| | | |
|---|---|---|
| (a) | Er halide selected from $ErX_3$ wherein X = Cl or Br | 10 to 40 mol % where X = Cl<br>10 to 50 mol % where X = Br |
| (b) | Rare earth halide selected from chlorides and bromides of La, Gd, Lu and Y | 0 to 80 mol % |
| (c) | Alkaline earth halide selected from alkaline earth chlorides and bromides | 5 to 80 mol % |
| (d) | Pb halide selected from Pb chloride and Pb bromide | 0 to 60 mol %. |

2. An infrared-to-visible up-conversion material capable of emitting luminescence in a range of 520–550 nm and 650–670 nm during irradiation, consisting of an inorganic material consisting essentially of:

| | | |
|---|---|---|
| (a) | Er halide selected from $ErX_3$ wherein X = Cl or Br | 20 to 40 mol % where X = Cl<br>20 to 50 mol % where X = Br |
| (b) | Rare earth halide selected from chlorides and bromides of La, Gd, Lu and Y | 0 to 80 mol % |
| (c) | Alkali metal halide selected from alkali metal chlorides and bromides | 30 to 80 mol % |
| (d) | Pb halide selected from Pb chloride and Pb bromide. | 0 to 60 mol % |

3. The infrared-to-visible up-conversion material as claimed in claim 1, wherein the inorganic material comprises $ErCl_3$, $YCl_3$, $BaCl_2$ and $PbCl_2$.

4. The infrared-to-visible up-conversion material as claimed in claim 2, wherein the inorganic material comprises $ErCl_3$, $YCl_3$, $BaCl_2$ and NaCl.

5. The infrared-to-visible up-conversion material as claimed in claim 1, wherein the inorganic material comprises $ErCl_3$, $YCl_3$, $BaCl_2$.

6. The infrared-to-visible up-conversion material as claimed in claim 2, wherein the inorganic material comprises $ErCl_3$, $YCl_3$, KCl and AgCl.

7. The infrared-to-visible up-conversion material as claimed in claim 2, wherein the inorganic material comprises $ErCl_3$, $YCl_3$, $PbCl_2$ and KCl.

8. The infrared-to-visible up-conversion material as claimed in claim 1, wherein the inorganic material comprises $ErCl_3$ and $BaCl_2$.

9. The infrared-to-visible up-conversion material as claimed in claim 1, wherein the inorganic material comprises $ErBr_3$ and $YBr_3$.

10. The infrared-to-visible up-conversion material as claimed in claim 2, wherein the inorganic material comprises $ErBr_3$, $YBr_3$ and KBr.

11. The infrared-to-visible up-conversion material as claimed in claim 2, wherein the inorganic material comprises $ErBr_3$, KBr, $PbBr_2$ and $YCl_3$.

12. An infrared light detecting element coated with the infrared-to-visible up-conversion material according to claim 1.

13. An infrared light detecting element coated with the infrared-to-visible up-conversion material according to claim 2.

* * * * *